INVENTOR.
BERNARD B. WOLSH

United States Patent Office 3,444,821
Patented May 20, 1969

3,444,821
AIR-INJECTOR MEANS FOR AIR-LIFT WATER PUMPS FOR REMOVING SCUM OR SLUDGE FROM SEWAGE TREATMENT SETTLING TANKS
Bernard B. Wolsh, 2350 Fernwood Road,
University Heights, Ohio 44118
Filed Aug. 9, 1967, Ser. No. 659,487
Int. Cl. F04f 1/18
U.S. Cl. 103—263      1 Claim

ABSTRACT OF THE DISCLOSURE

Air-injector means for air-lift pumps, providing unrestricted upward air flow, having an air reflector wall lying entirely within the projected circumference of its mounting hole in the wall of the exhaust side of the pump.

---

The primary object of this invention is to provide an air-lift pump actuated, scum or sludge remover for sewage treatment settling tanks, that has novel, non-clogging and self cleaning air-injector means.

Another object is to provide a device of the type stated having an air-injector nozzle of uniform diameter that can be fitted into a straight bore in the wall of the exhaust side of the pump.

A further object is to provide an air-injector nozzle having an air-deflector wall at the air discharge end thereof that does not extend beyond the circumference of the air-injector nozzle body.

These and other objects of the invention will become apparent from a reading of the following specification and claims, together with the accompanying drawing, wherein like parts are referred to and indicated by like reference numerals, and wherein;

Figure 7:
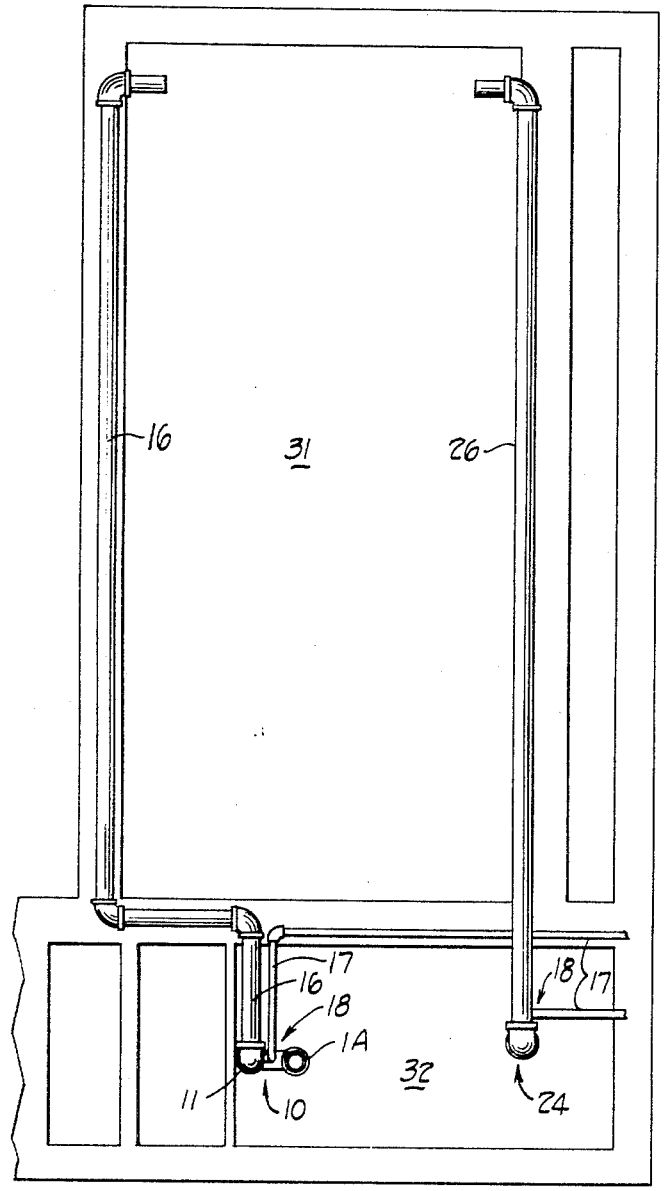
Figure 6:
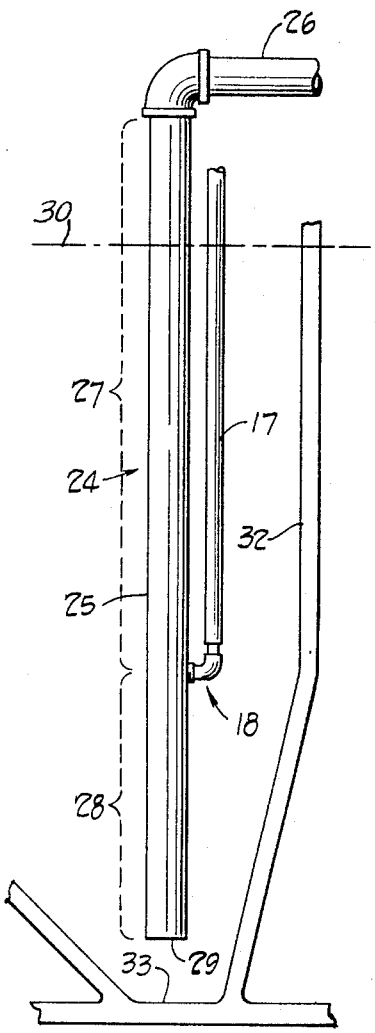

FIGURE 6 is a side elevation of the air-injector means that is the subject of this invention, showing it mounted in an air-lift pump actuated sludge remover, mounted in the settling tank of a sewage treatment installation; and, FIGURE 7 is a top plan view of a sewage treatment installation showing both scum and sludge removers mounted in the settling tank thereof, with exhaust pipes leading therefrom, to return removed scum and sludge back to the aeration tank thereof for further treatment.

Figure 1:
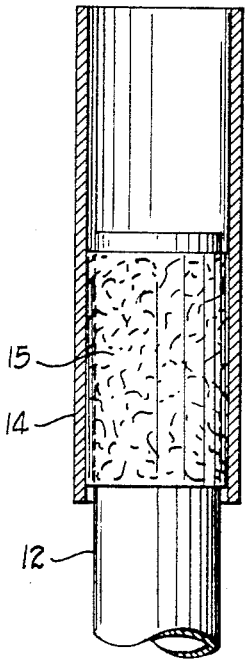
FIGURE 1 is a side elevation of the air-injector means that is the subject of this invention, showing it mounted in the exhaust pipe wall of an air-lift pump actuated scum remover for sewage treatment settling tanks.

Referring more particularly to the drawing, there is seen in FIGURE 1, a scum remover air-lift pump, broadly indicated by reference numeral 10, having the air-injector means, broadly indicated by reference numeral 18, that is the subject of the invention.

The scum remover 10 is U-shaped, with vertically extending and parallel tubular fluid intake and exhaust arms 12 and 11, respectively, approximately 1½" in diameter, of unequal length, connected at their lower ends through a curved section 13, to provide a continuous fluid passageway.

The upper end of the exhaust arm 11 is connected to a discharge line 16 that empties into the aeration tank 31, at the far end thereof, as seen in FIGURE 7, where the discharged scum is subjected to further aeration.

The upper end of the intake arm 12 stops at a point substantially below the water level 30 in the settling tank and has a sleeve 14 slidably mounted thereon in frictional, sealed, engagement with the arm 12, through a tubular resilient gasket 15.

The gasket 15 is preferably fabricated of sponge rubber, or plastic, and permits the sleeve 14 to be adjusted either up or down the arm 12, to locate its top end at the water level line 30.

The inherent resilient properties of the gasket 15 act to maintain the sleeve 14, automatically, at whatever position it may be set. The so constructed gasket 15 is non-corrosive, and therefore the sleeve 14 may be easily shifted up or down the arm 12 to accommodate it to changes in the water level 30, even though a long time may elapse between changes in the operating water level.

Figure 2:
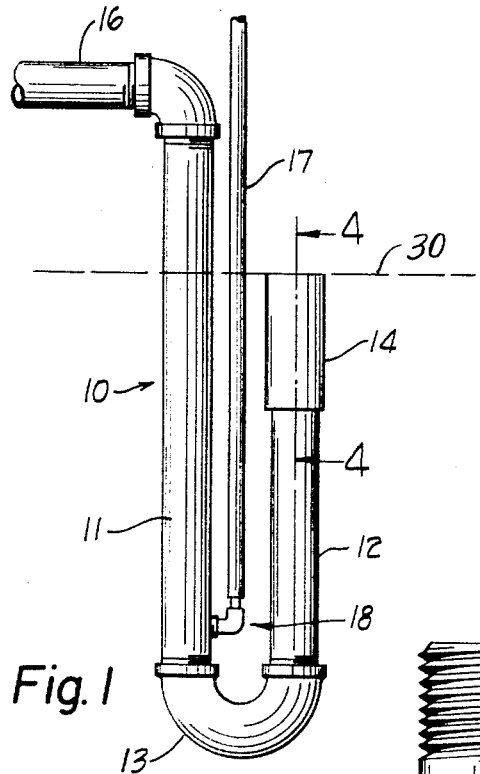
FIGURE 2 is an enlarged view, partly in section, of a portion of the air-lift pump exhaust pipe, showing the manner in which the air-injector nozzle is mounted through the wall thereof.

Reference numeral 22, as seen most clearly in FIGURE 2, indicates an internally threaded straight bore in the wall of the exhaust arm 11, located approximately 6" above the bottom end of the arm 11, as seen in FIGURE 1.

The air-injector means, or nozzle, 18, comprises a cylindrical body 19 adapted to engage the exhaust arm bore 22 through external threads 23, as is seen most clearly in FIGURE 2. The body 19 has an air-delivery bore, therethrough, connected at its intake end to a source of compressed air through a ⅜" air-line 17. The preferred pressure in the line is relatively low, that is, 5 p.s.i.

A deflector wall 21, of semi-conical shape, is mounted on the body 19 across the discharge end of the air-delivery bore 20.

Figure 5:
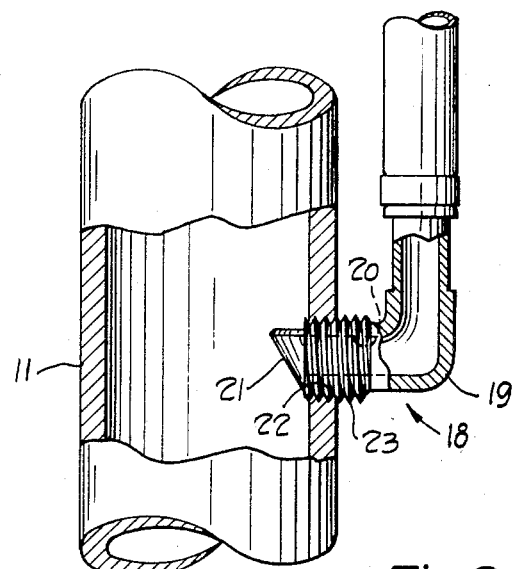
FIGURE 5 is a left-end view of the air-injector means illustrated in FIGURE 3.
Figure 3:
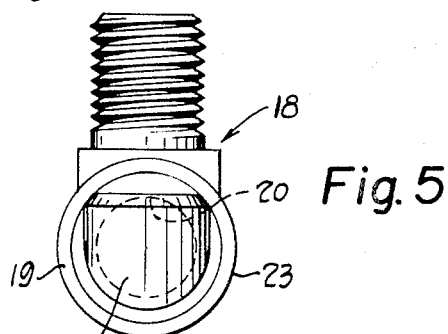
FIGURE 3 is a top plan view of the air-injector means, in its un-mounted condition.
Figure 4:
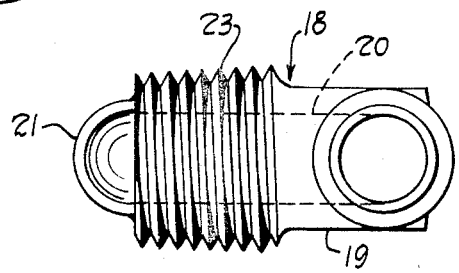
FIGURE 4 is a vertical sectional view taken along the line and in the direction of the arrows 4—4 of of FIGURE 1.

The base end of the semi-conical wall 21 is open and lies in a plane at 90° to the diameter of the bore 20, and, acts to direct the air leaving the discharge end of the bore in a path at 90° to the body bore axis, as seen in FIGURES 2, 3 and 5.

The deflector wall 21 lies entirely within the projected circumference of the cylindrical body 19, as is most clearly seen in FIGURE 5.

The air-injector unit 18 may be easily and directly screwed into bore 22, and mounted therethrough with the deflector wall 21 positioned inside the exhaust arm 11, with its base end directed upward to cause the discharged air to follow an upward path in the fluid within the arm 11. The so injected air mixes with the fluid in the exhaust arm 11. The column of water in the arm 11 is impregnated with the air injected therein which makes the water lighter, so that the pressure of the column of air and water at the bottom of the arm 11 is less, per square inch, than that of the column of un-aerated water in the intake arm 12, creating an upward flow in the exhaust arm 11, in response to well known natural physical laws, and a resultant downward flow in the intake arm 12 which acts to cause the surface water 30 in the settling tank to flow down the intake arm 12, carrying with it any scum that may be floating on the water surface 30.

The so removed scum is carried by the water flowing up—through the exhaust arm 11 and emptied from the discharge line 16 at the far end of the aeration tank of the sewage treatment unit 34, for further digestion, as seen in FIGURE 7.

Now, referring to FIGURE 6, there is seen a sludge-remover, broadly indicated by reference numeral 24, which is activated by the air-injector means 18, just described.

In this application the air-injector is mounted through a straight bore in the wall of a single length of pipe 25, mounted vertically in the settling tank 32 approximately ⅓ the distance from the bottom 33 of the tank to its water level 30. The open lower end of the sludge-remover 24 is proximate to and spaced from the tank floor 33.

That portion of the pipe 25 below the air-injector 18 defines the fluid intake section 28 of the sludge-remover air-lift pump 24, and that portion above the air-injector 18 defines the fluid exhaust section 27.

Again, the pressure of the column of air and water in the exhaust section 27, above the air-injector 118, is less per square inch than that of the column of un-aerated water in the intake section 28, causing sludge bearing fluid to be drawn up into the exhaust section 27 and discharged into the far end of the aeration tank 31 from the end of the delivery pipe 26, as seen in FIGURE 7.

Thus, by mounting both the scum-removing unit 10 and the sludge-removing unit 24 in the settling tank 32, as seen in FIGURE 7, the settling tank 32 is automatically kept free of scum and sludge.

The described air-injector means 10 is easy to install, since it merely needs to be screwed straight into a bore in the wall of the air-lift pump, to be ready for operation. There are no projecting parts that have to be manipulated to clear the opening the pump wall, in which it is mounted.

Since, the inverted, open, semi-conical air-deflector wall 21 and the air-delivery bore 20 are continuous and uniform in area, any dirt that may tend to settle therein is automatically blown out by the compressed-air in the system. Nor, are there any restricted passageways, or orifices, present to corrode and reduce the volume of air entering the air-lift pump, as may be found in prior art air-injection systems.

It will now be clear that there is provided a device which accomplishes the objectives heretofore set forth.

I claim:

1. In an air-lift water pump, an air-injector, comprising, a cylindrical body adapted to be fitted through a straight bore in the wall of the exhaust pipe of the air-lift pump; said cylindrical body having an air-delivery bore therethrough adapted to be connected, at its intake end, to a source of compressed air; and, an air deflector-wall positioned on the body across the discharge end of the air-delivery bore; said deflector-wall being semi-conical in shape with an open base end lying in a plane at 90° to the body bore diameter, to direct discharged air in a path at 90° to the body bore axis; said deflector-wall being entirely within the projected circumference of the cylindrical body.

References Cited

UNITED STATES PATENTS

| | | | |
|---|---|---|---|
| 3,234,880 | 2/1966 | Hampton | 103—2 |
| 3,282,226 | 11/1966 | Repp | 103—232 |
| 3,304,868 | 2/1967 | Swan | 103—232 X |
| 3,319,579 | 5/1967 | Stack | 103—263 |
| 3,340,819 | 9/1967 | Allen | 103—232 |

WILLIAM L. FREEH, *Primary Examiner.*

WARREN J. KRAUSS, *Assistant Examiner.*

U.S. Cl. X.R.

103—232